(12) United States Patent
Chen

(10) Patent No.: US 6,904,376 B2
(45) Date of Patent: Jun. 7, 2005

(54) CALIBRATION DEVICE FOR A 2D IMAGE DISPLAY MODULE

(76) Inventor: Chris Chen, 2396 Scenic Ridge Dr., Chino Hills, CA (US) 91709

( * ) Notice: Subject to any disclaimer, the term of this patent is extended or adjusted under 35 U.S.C. 154(b) by 61 days.

(21) Appl. No.: 10/649,943

(22) Filed: Aug. 28, 2003

(65) Prior Publication Data

US 2005/0049808 A1 Mar. 3, 2005

(51) Int. Cl.[7] .............................................. G06F 19/00
(52) U.S. Cl. ......................................... 702/85; 359/463
(58) Field of Search ............................. 702/85; 359/463, 359/823, 168; 473/481, 422, 488; 220/521; 356/401; 348/96

(56) References Cited

U.S. PATENT DOCUMENTS

2003/0117711 A1 * 6/2003 Kowarz et al. ............. 359/618
2003/0161040 A1 * 8/2003 Ishii et al. ................... 359/463
2004/0080614 A1 * 4/2004 Uemura ........................ 348/96

* cited by examiner

Primary Examiner—John Barlow
Assistant Examiner—Xiuqin Sun
(74) Attorney, Agent, or Firm—Fei-Fei Chao; Bingham McCutchen LLP (57) ABSTRACT

A calibration device for a two dimensional (2D) image display module includes a securing member adapted to secure the lens to the box and having extensions extending out from the box, multiple first elongated holes in opposite sides of the backboard to correspond to the extensions and multiple second elongated holes in opposite sides of the lens to align with the first elongated holes of the backboard such that the extensions extending through the corresponding first elongated holes of the backboard are able to extend through the second elongated holes of the lens. A riveting device is provided to allow the lens to be pivotable relative to the box. Pivotal movement of the cam in a cam hole in the lens is able to force the backboard to move linearly and thus relative position between the lens and the backboard is adjusted.

3 Claims, 13 Drawing Sheets

CALIBRATION DEVICE FOR A 2D IMAGE DISPLAY MODULE

BACKGROUND OF THE INVENTION

1. Field of the Invention

The present invention relates to a calibration device, and more particularly to calibration device for use with a two dimensional (2D) image display module having a backboard with a pattern attached thereto and a lens connected to the backboard.

2. Description of Related Art

Figure 12:
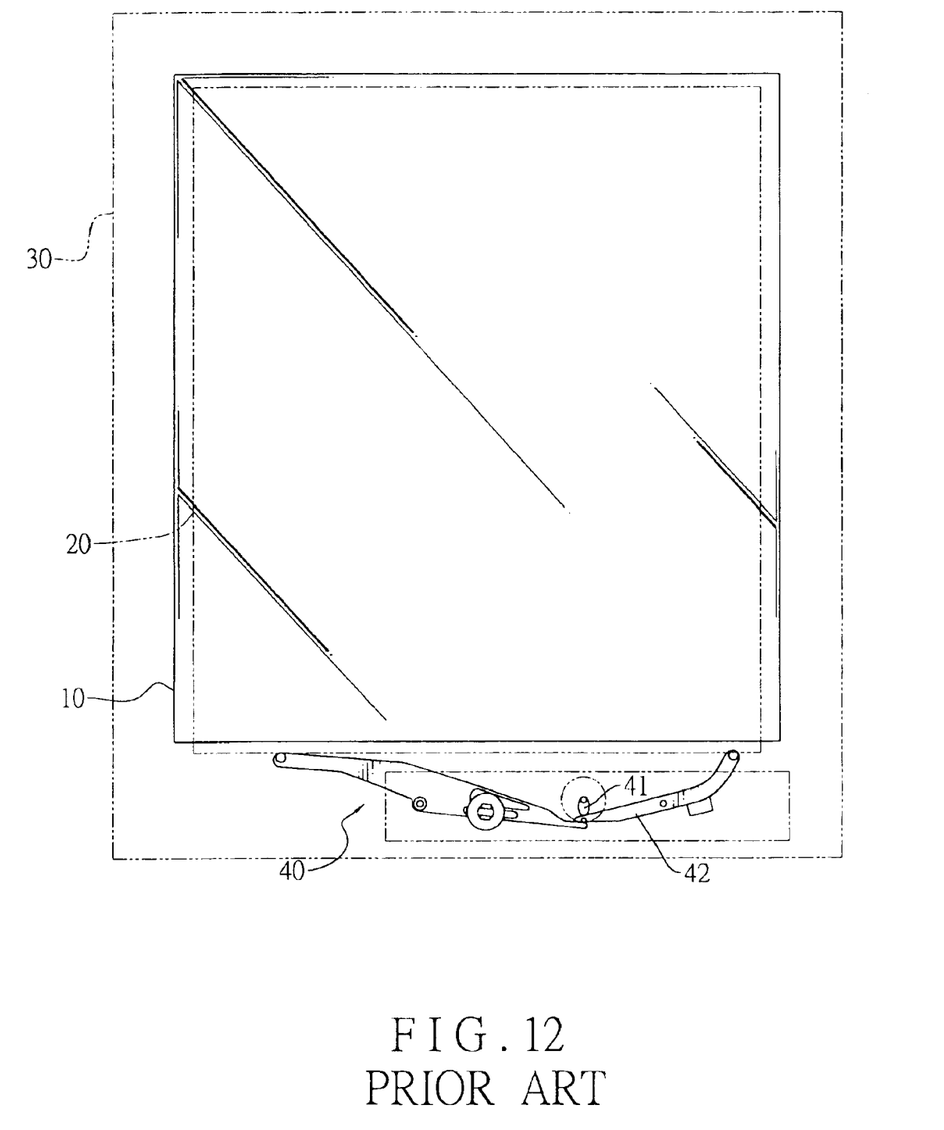
FIG. 12 is a schematic view showing a conventional transmission device used in a 2D image display module.
Figure 13:
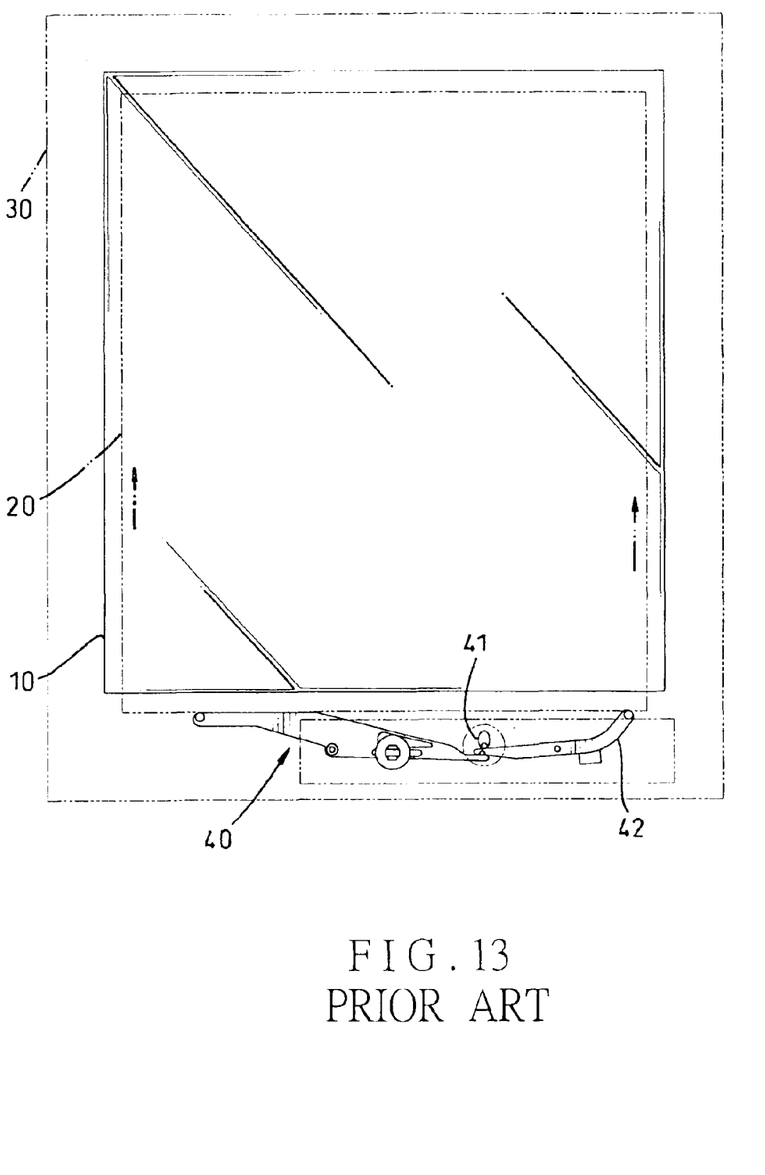
FIG. 13 is a schematic view showing that the pattern sandwiched between the lens and the backboard is adjusted via the transmission device.

With reference to FIGS. 12 and 13, a conventional two dimensional (2D) image display module has a pattern (20) movably sandwiched between a backboard (10) and a lens (30). A transmission device (40) having a cam (41) rotatably mounted on the base plate (30) and two arms (42) pivotally connected to the lens (30). Distal ends of each of the two arms (42) are connected to the cam (41) such that when the cam (41) is rotated, the two arms (42) are able to pivot relative to the lens (30). Because the other distal ends of the two arms (42) are engaged with the pattern (20), when the two arms (42) are pivoted, the pattern (20) is moved upward and downward repeatedly. The pattern (20) is thus able to present different pictures based on the angle selected via the lens (30). It is noted from the conventional transmission device (40) that after the two arms (42) are pivoted, the pattern (20) falls back to its original position by gravity. When the humidity in the air becomes dense, the movement of the pattern (20) becomes sluggish and sometimes may not maintain in its original space, which results in that the observer can not have a very clear image in that the image presenting angle between the pattern (20) and the lens (30) is misaligned.

Still further, after the pattern (20) is first inserted between the lens (30) and the backboard (10), calibration of the image presenting angle between the pattern (20) and the lens (30) has to be done manually. That is, the operator has to move around the pattern (20) with the lens (30) fixed or the lens (30) with the pattern (20) moved so as to have the best image presenting angle, which is quite troublesome and inefficient.

To overcome the shortcomings, the present invention tends to provide an improved calibration device for a 2D image display module to mitigate the aforementioned problems.

SUMMARY OF THE INVENTION

The primary objective of the present invention is to provide an improved calibration device adapted to be mounted on the 2D image display module such that calibration of the image presenting angle between the lens and the pattern is easily accomplished.

Other objects, advantages and novel features of the invention will become more apparent from the following detailed description when taken in conjunction with the accompanying drawings.

DETAILED DESCRIPTION OF THE PREFERRED EMBODIMENT

Figure 1:
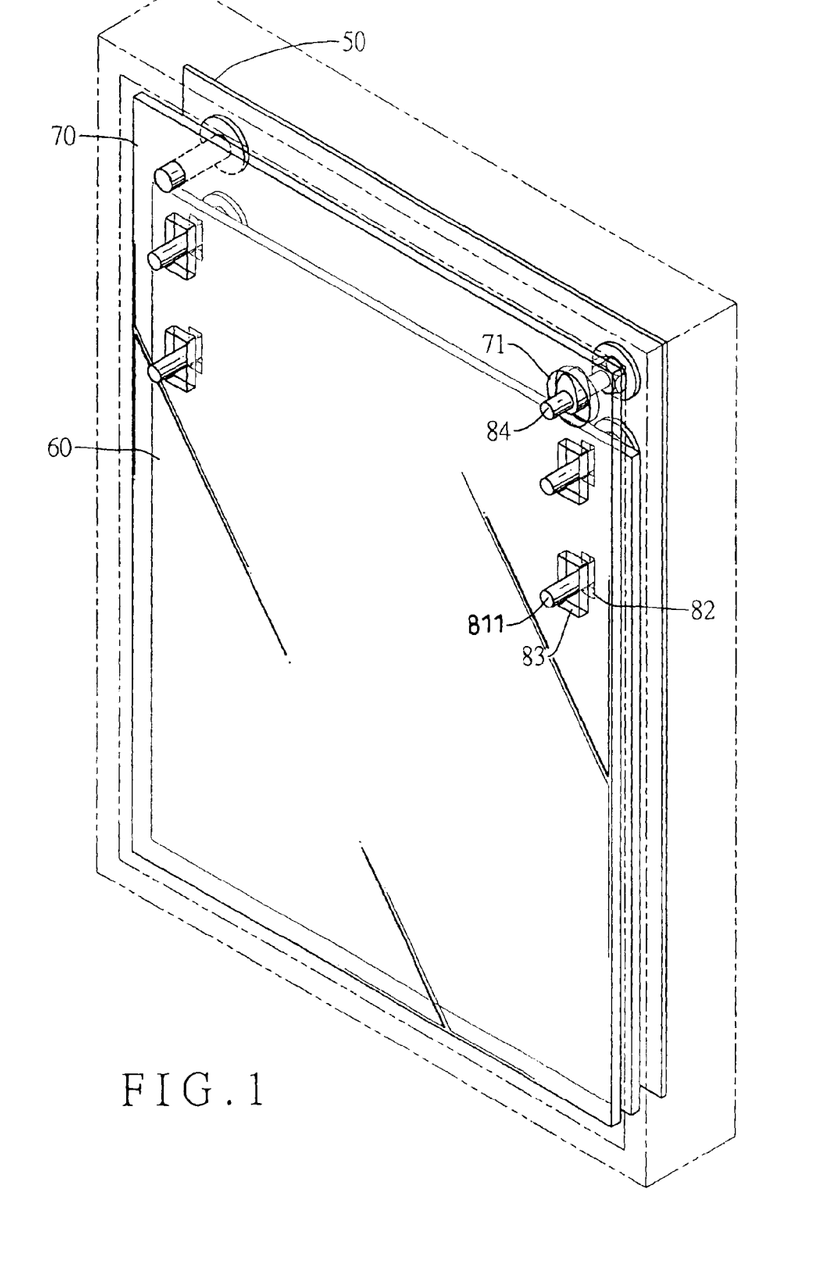
FIG. 1 is a perspective view of the calibration device adapted to be mounted on the 2D image display module.

With reference to FIG. 1, it is to be noted that a two dimensional (2D) image display module is essentially composed of a box (50) with a top opening, a lens (70) and a backboard (60) sandwiched between the lens (70) and a bottom face defining the top opening of the box (50). A pattern (not shown) is normally attached to a top side of the backboard (6) to face the lens (70).

Figure 2:
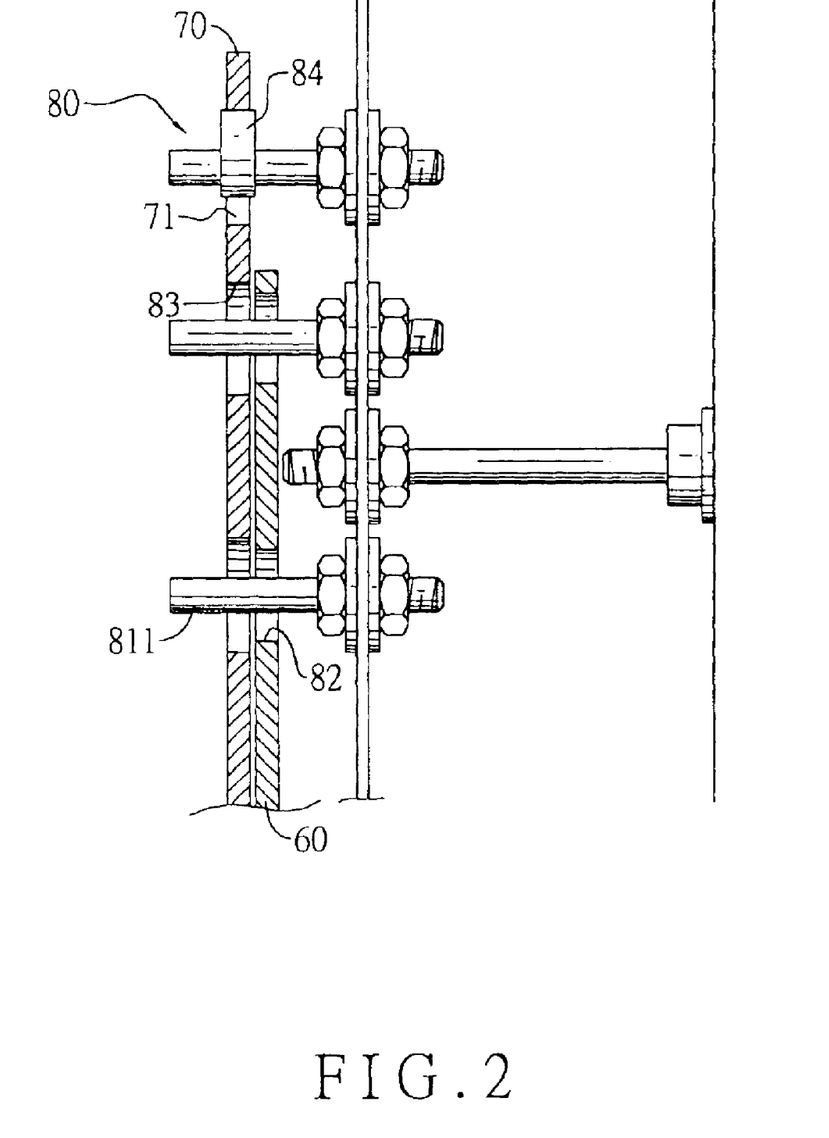
FIG. 2 is a schematic side view showing that the calibration device is adapted to be mounted on the backboard.

With reference to FIG. 2, the calibration device (80) in accordance with the present invention includes a securing member (81) having multiple extensions (811) extending out of the backboard (60) and the lens (70) and first elongated holes (82) respectively defined in opposite sides of the backboard (60) and second elongated holes (83) defined in opposite sides of the lens (70). Both the first elongated holes (82) and the second elongated holes (83) correspond to the extensions (811) of the securing element (81). Furthermore, a corner of the lens (70) is securely connected to the bottom face of the top opening of the box; (50) via riveting resulting in that the lens (70) is pivotable relative to the box (50). A cam (84) is adapted to be rotatably mounted on the bottom face defining the top opening of the box (50) and extended out from a cam hole (71) adapted to be defined through the lens (70). It is to be noted that each first elongated hole (82) has a dimension smaller than that of each of the second elongated hole (83). Due to the extensions (811) extending out from both the first and second elongated holes (82,83) and the cam (84) extending out from the cam hole (71) in the lens (70), pivotal movement of the cam (84) allows the lens (70) to pivot as well. However, when the lens (70) is pivoted, due to the extensions (811) extending out from the first elongated holes (82) of the backboard (60), the backboard (60) is not able to pivot along with the lens (70) but move up and down.

When the backboard (60) is forced to move up and down due to the limitation of the extensions (811) and the first elongated holes (82), relative angle between the backboard (60) and the lens (70) is changed (or adjusted). As a result, the pattern attached to a face of the backboard (60) and sandwiched between the backboard (60) and the lens (70) is able to have the best image presenting angle. A securing rod (not numbered) is provided to secure the box (50) to a surface so as to stabilize the entire 2D image display module.

Figure 3:
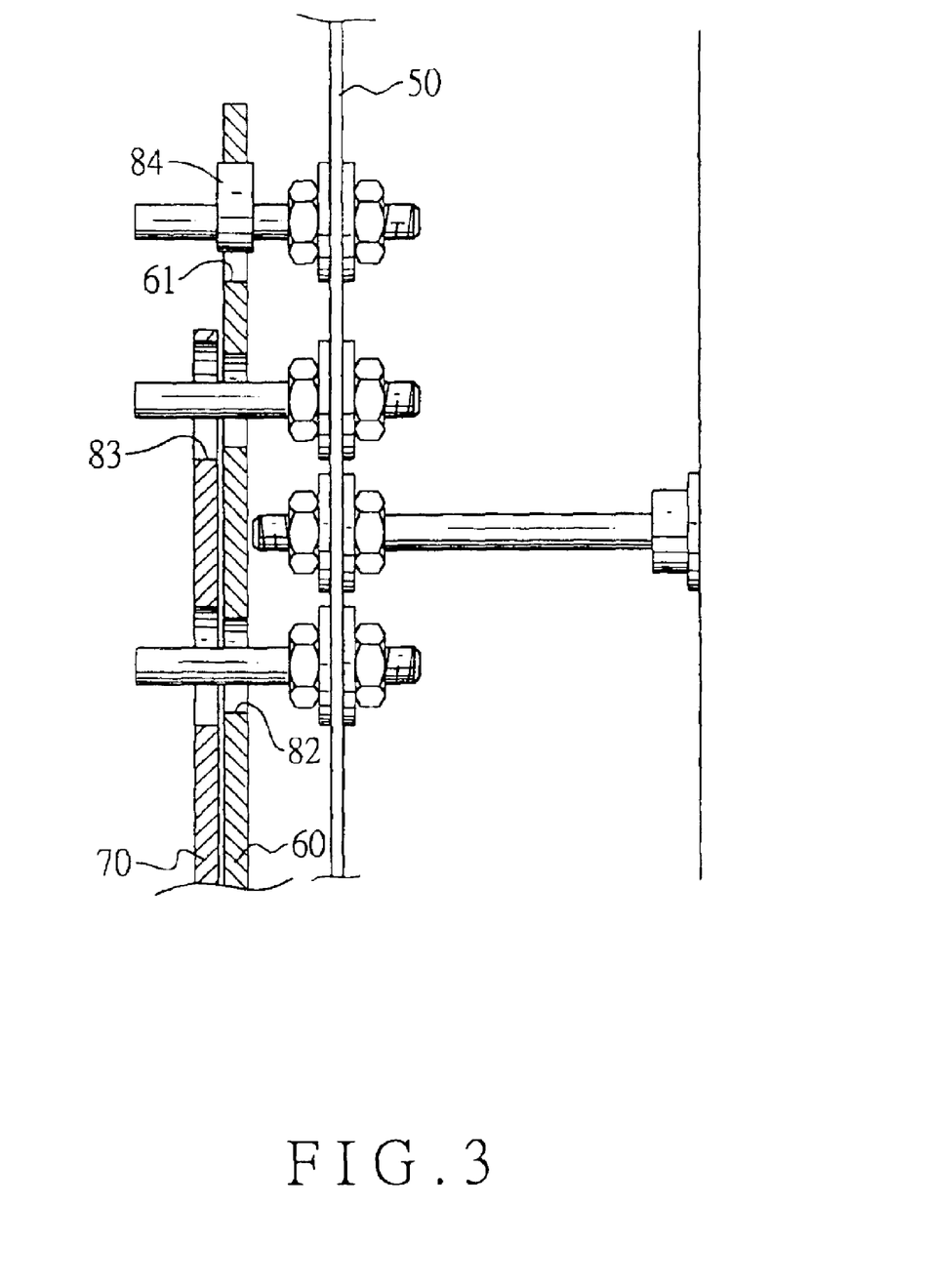
FIG. 3 is a schematic side view showing that the calibration device is adapted to be mounted on the lens.

With reference to FIG. 3, it is to be noted that the cam (84) is extended out of a cam hole (61) in the backboard (60). Therefore, to accomplish the same adjusting effect as that disclosed in FIGS. 1 and 2, the backboard (60) has a corner riveted to the bottom face defining the top opening of the box (50) and is pivotable relative to the box (50). In this embodiment, when the cam (84) is pivoted, the pivotal movement of the backboard (60) forces the lens (70) to move up and down, which accomplishes the objective of adjusting the relative position between the lens (70) and the backboard (60) and thus an image presenting angle is adjusted.

Figure 4:
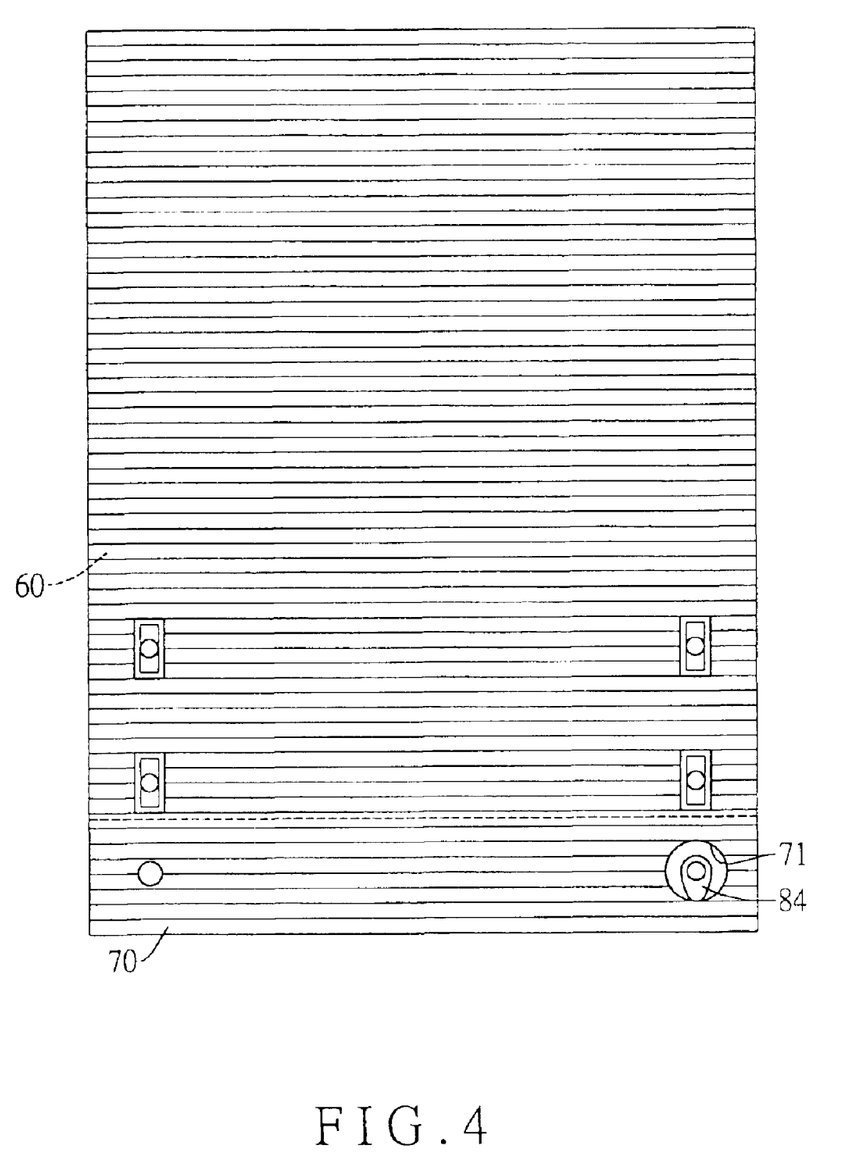
FIG. 4 is a schematic view showing that the calibration device is adapted to be mounted on the right side bottom corner of the lens.
Figure 5:
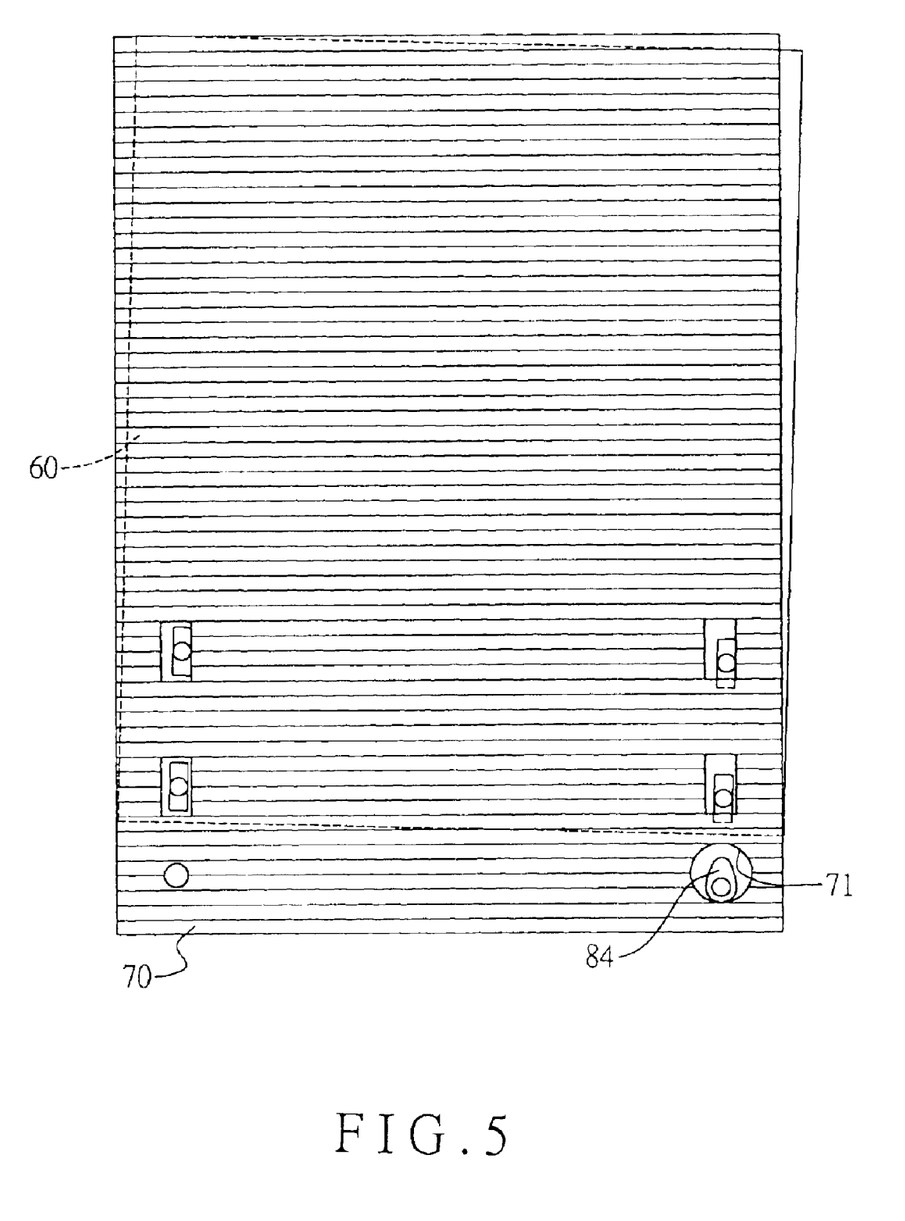
FIG. 5 is a schematic view showing that the backboard is adjusted relative to the lens via the calibration device of the present invention.

With reference to FIGS. 4 and 5, it is noted that the cam (84) is provided on the right side bottom corner of the lens (70). That is, the cam hole (71) is defined in the right side bottom corner of the lens (70) to allow the extension of the cam (84) which is rotatably adapted to be mounted on the bottom face defining the top opening of the box. Therefore, when the cam (84) is pivoted, the upward or downward movement of the backboard (60) changes the relative position between the backboard (60) and the lens (70), which accomplishes the objective of adjusting the observation angle to the pattern attached to the backboard and sandwiched between the backboard and the lens.

Figure 6:
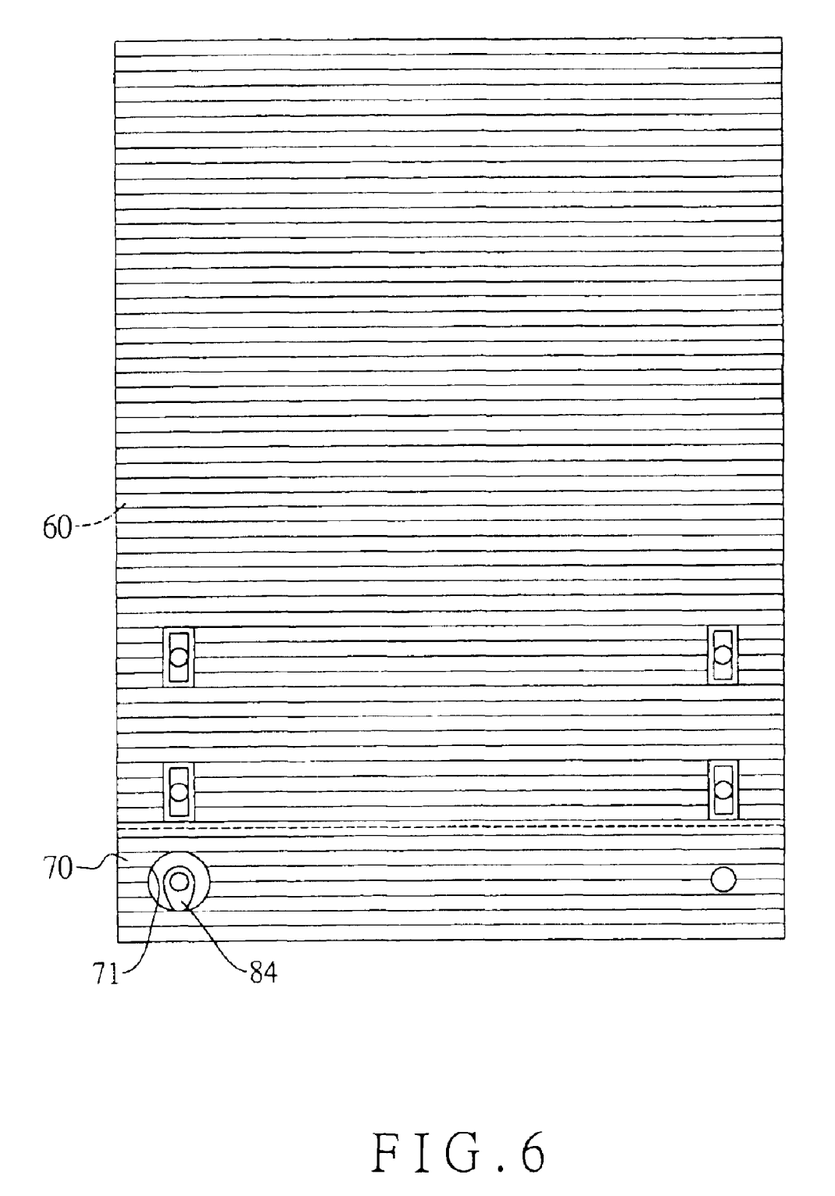
FIG. 6 is a schematic view showing that the calibration device is adapted to be mounted on the left side bottom corner of the lens.
Figure 7:
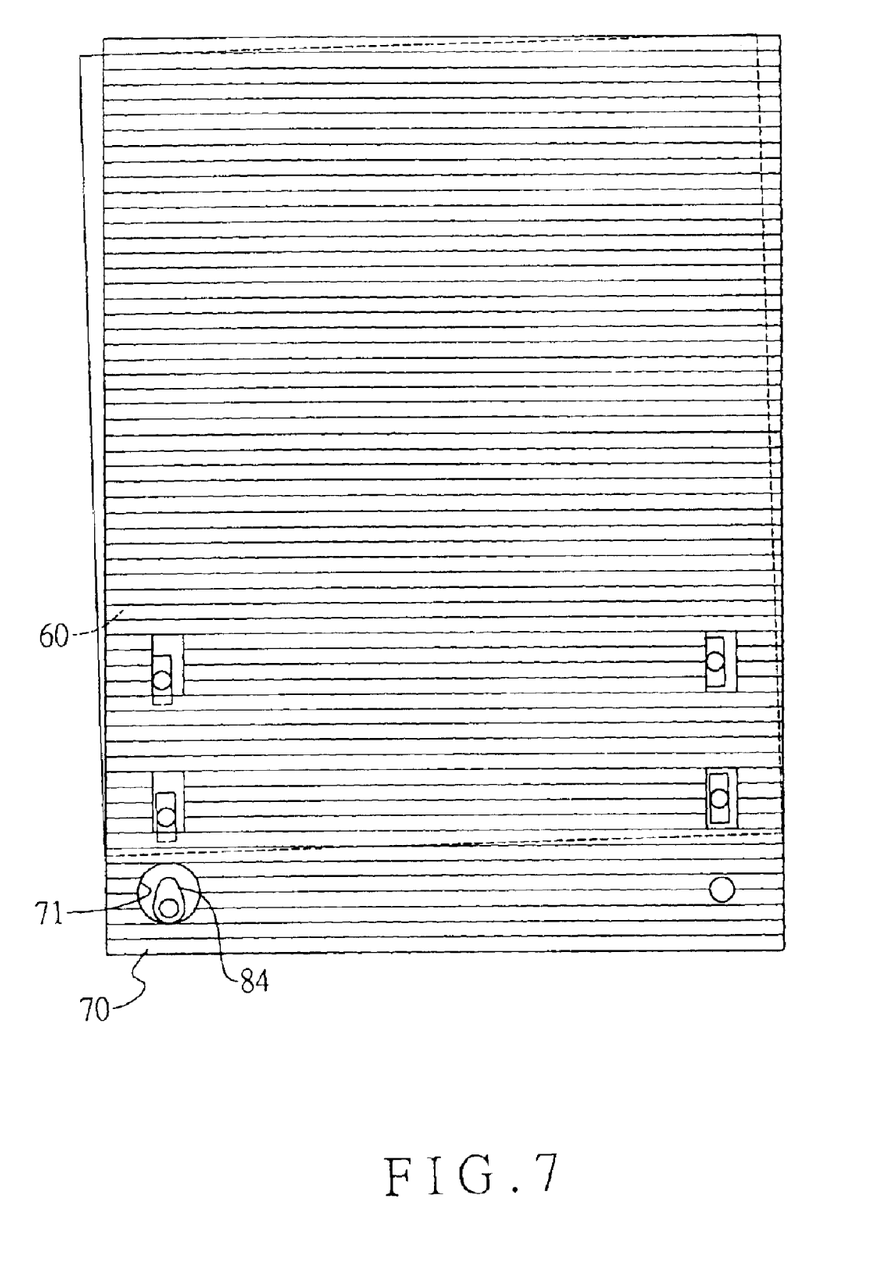
FIG. 7 is a schematic view showing that the backboard is adjusted relative to the lens via the calibration device of the present invention.

With reference to FIGS. 6 and 7, it is noted that the cam (84) is provided on the left side bottom corner of the lens (70). That is, the cam hole (71) is defined in the left side bottom corner of the lens (70) to allow the extension of the cam (84) which is rotatably adapted to be mounted on the bottom face defining the top opening of the box. Therefore, when the cam (84) is pivoted, the upward or downward movement of the backboard (60) changes the relative position between the backboard (60) and the lens (70), which accomplishes the objective of adjusting the observation angle to the pattern attached to the backboard and sandwiched between the backboard and the lens.

Figure 8:
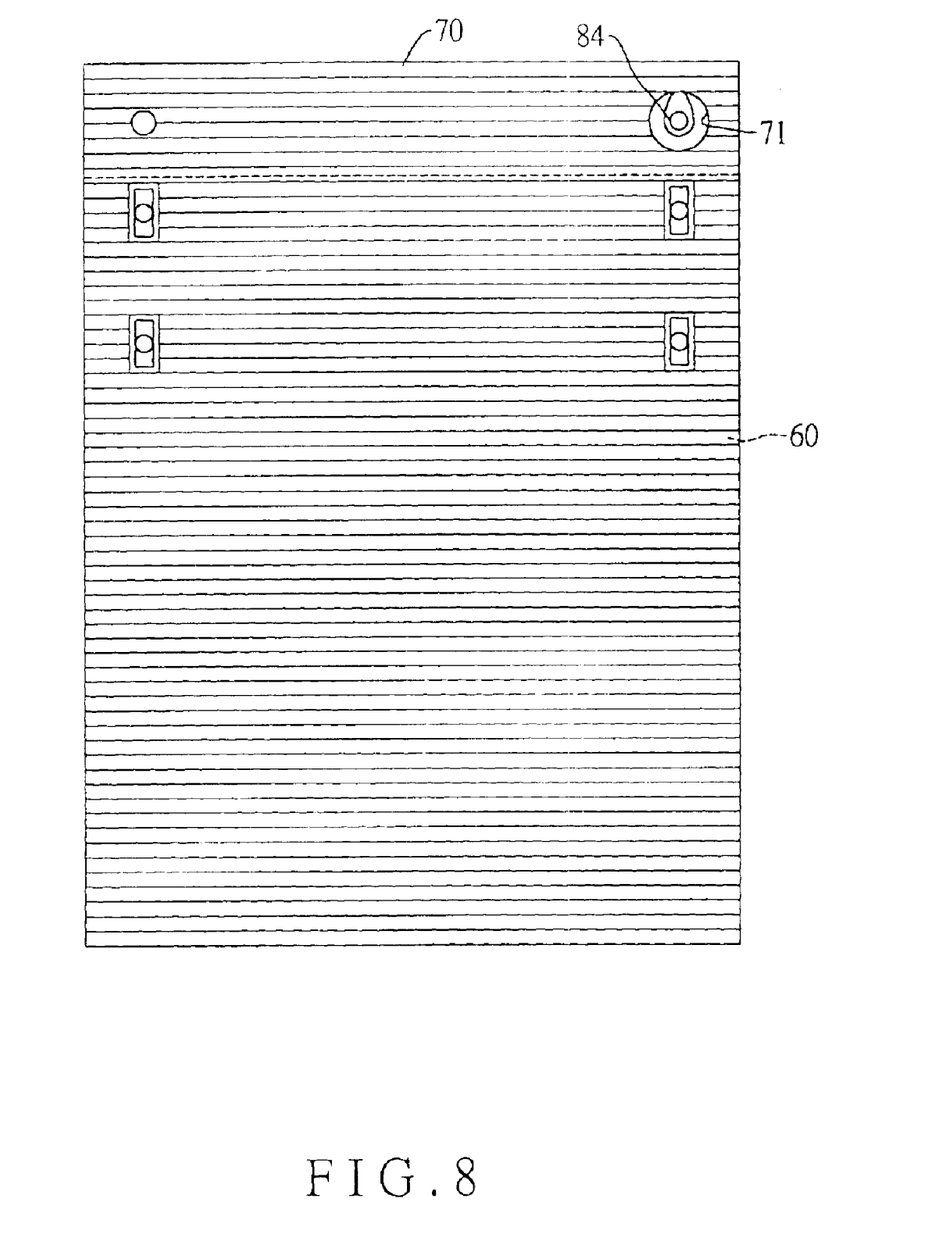
FIG. 8 is a schematic view showing that the calibration device is adapted to be mounted on the right side top corner of the lens.
Figure 9:
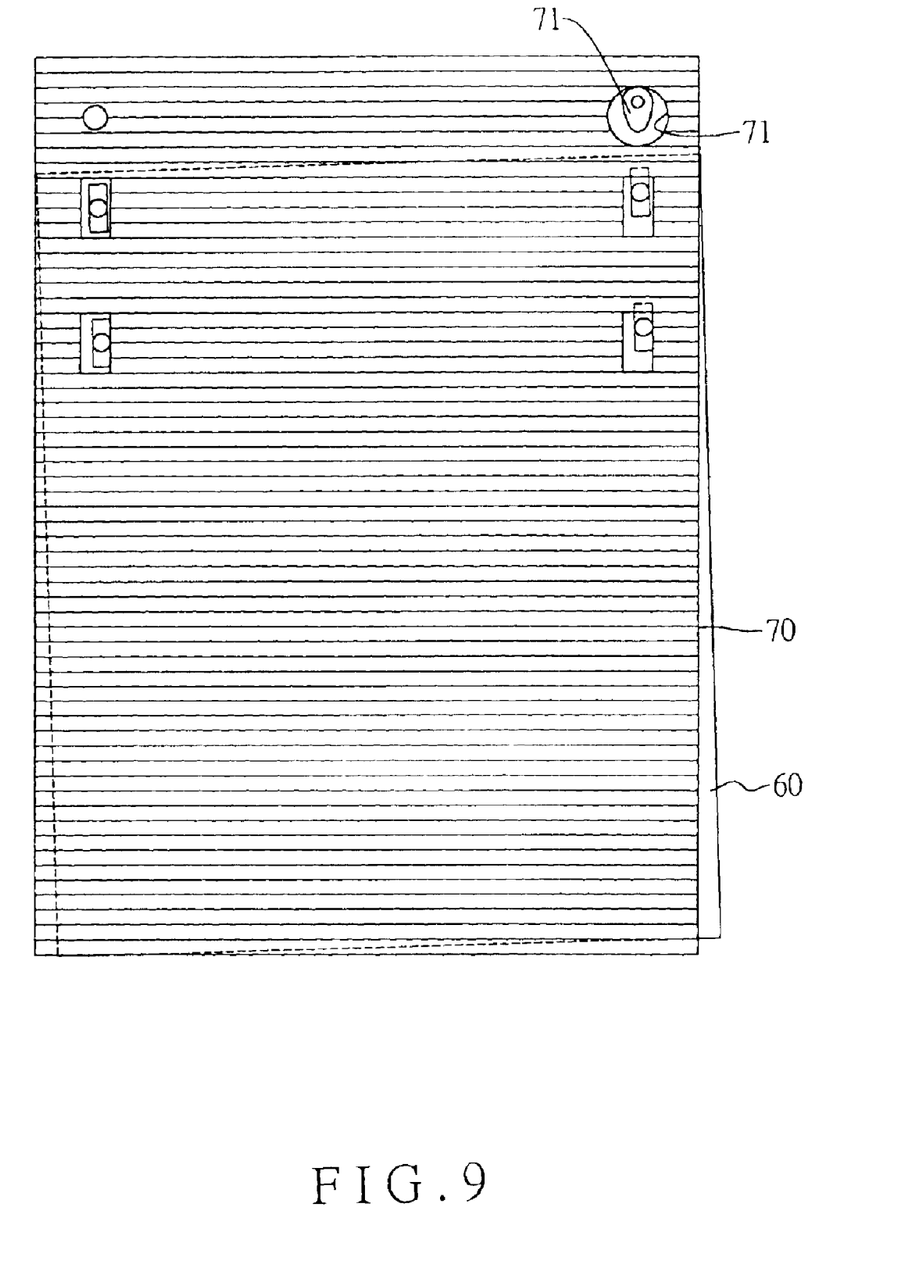
FIG. 9 is a schematic view showing that the backboard is adjusted relative to the lens via the calibration device of the present invention.

With reference to FIGS. 8 and 9, it is noted that the cam (84) is provided on the right side top corner of the lens (70). That is, the cam hole (71) is defined in the right side top corner of the lens (70) to allow the extension of the cam (84) which is rotatably adapted to be mounted on the bottom face defining the top opening of the box. Therefore, when the cam (84) is pivoted, the upward or downward movement of the backboard (60) changes the relative position between the backboard (60) and the lens (70), which accomplishes the objective of adjusting the observation angle to the pattern attached to the backboard and sandwiched between the backboard and the lens.

Figure 10:
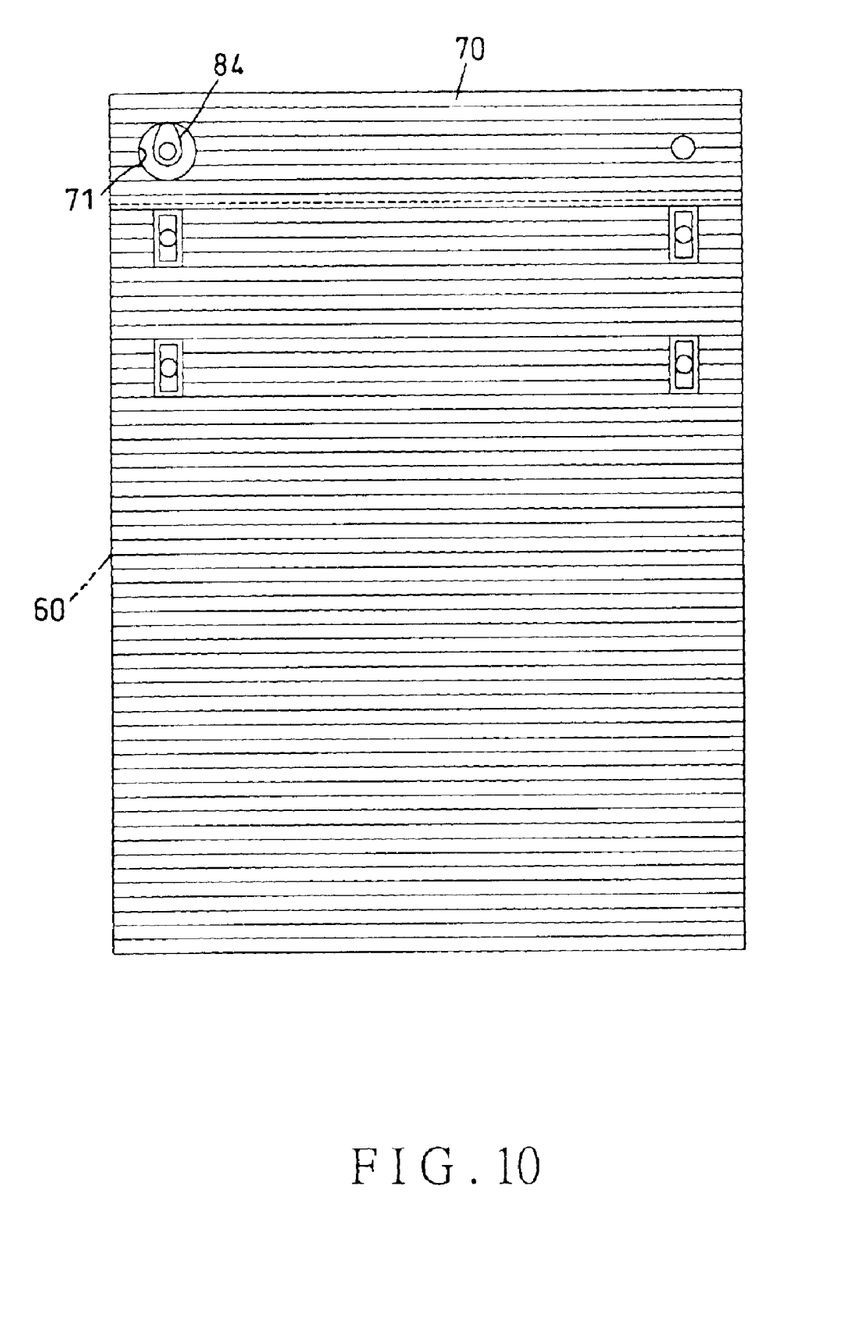
FIG. 10 is a schematic view showing that the calibration device is adapted to be mounted on the left side top corner of the lens.
Figure 11:
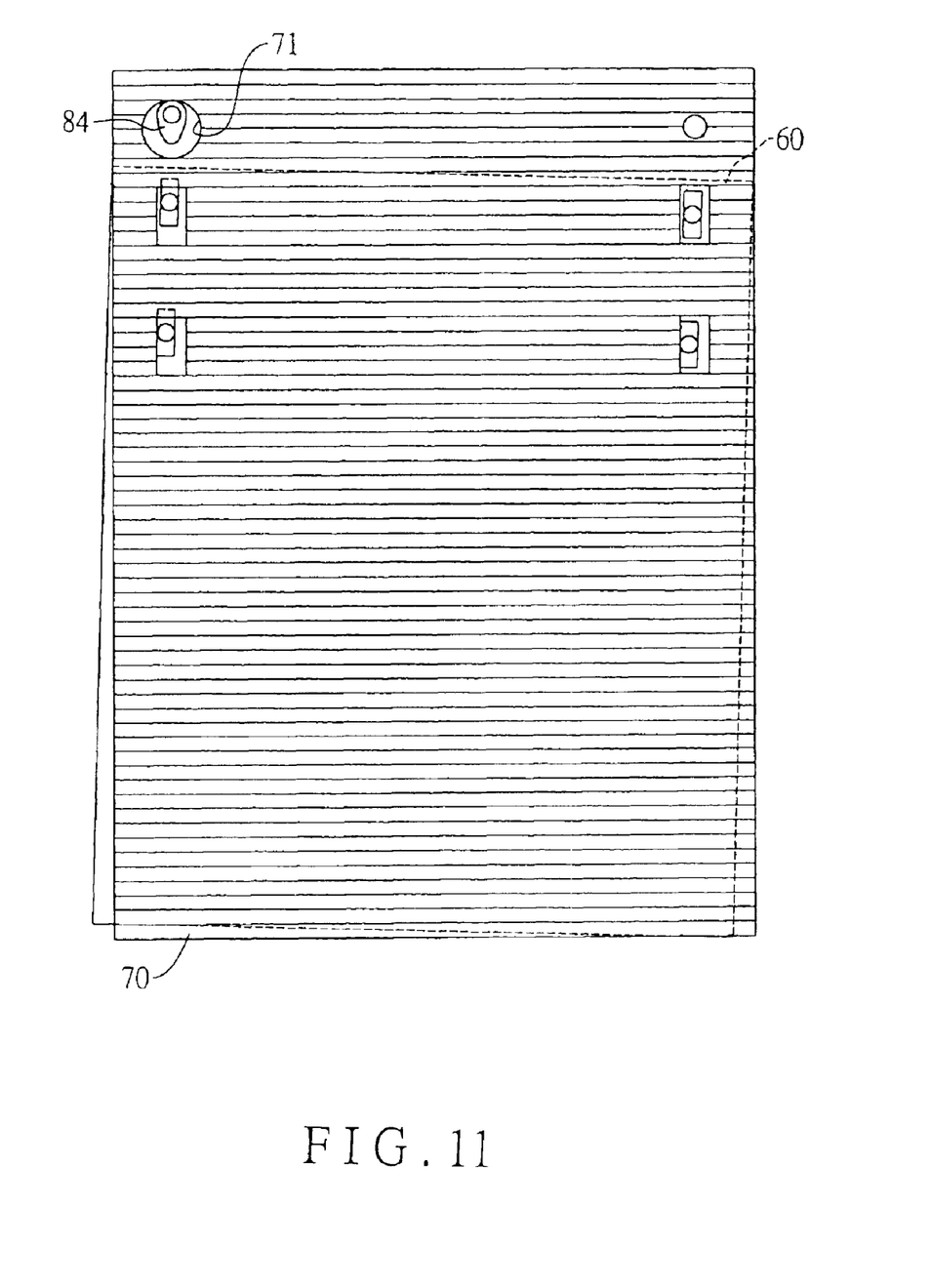
FIG. 11 is a schematic view showing that the backboard is adjusted relative to the lens via the calibration device of the present invention.

With reference to FIGS. 10 and 11, it is noted that the cam (84) is provided on the left side top corner of the lens (70). That is, the cam hole (71) is defined in the left side top corner of the lens (70) to allow the extension of the cam (84) which is rotatably adapted to be mounted on the bottom face defining the top opening of the box. Therefore, when the cam (84) is pivoted, the upward or downward movement of the backboard (60) changes the relative position between the backboard (60) and the lens (70), which accomplishes the objective of adjusting the observation angle to the pattern attached to the backboard and sandwiched between the backboard and the lens.

Furthermore, the power to pivot the cam (84) may be from the operator or mechanical power, i.e. the step motor. Thus, the step motor may be programmed to adjust the relative position between the lens and the backboard to accomplish the objective of adjusting the image presenting angle.

From the foregoing description, it is noted that the pattern may be randomly placed between the lens and the backboard without worrying that the pattern might be out of focus in relation to the lens because of the provision of the calibration device of the present invention. Furthermore, the structure of the calibration device of the present invention is simple and inexpensive such that manufacturing cost is low and maintenance is easy.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A calibration device for a two dimensional (2D) image display module having a box with a top opening, a lens received in the box and a backboard sandwiched between a bottom face defining the top opening of the box and the lens, the calibration device comprising:

a securing member adapted to secure the lens to the bottom face defining the top opening of the box and having extensions extending out from the bottom face defining the top opening of the box;

multiple first elongated holes adapted to be defined in opposite sides of the backboard to correspond to the extensions;

multiple second elongated holes adapted to be defined in opposite sides of the lens to align with the first elongated holes of the backboard such that the extensions extending through the corresponding first elongated holes of the backboard are able to extend through the second elongated holes of the lens;

a riveting device adapted to a first corner of the lens to allow the lens to be pivotable relative to the box; and a cam adapted to be rotatably mounted on the bottom face defining the top opening of the box and extending out of a cam hole in a second corner of the lens opposite to the first corner such that pivotal movement of the cam is able to force the backboard to move linearly and thus relative position between the lens and the backboard is adjusted.

2. The calibration device as claimed in claim 1, wherein each first elongated hole has a dimension smaller than that of each of the second elongated holes so that the pivotal movement of the cam is able to pivot the lens, which results in that the backboard is forced to move linearly.

3. The calibration device as claimed in claim 2, wherein the riveting device is a rivet extending through the lens and into the box to allow the lens to pivot with respect to the box.

* * * * *